(12) United States Patent
Yamaguchi et al.

(10) Patent No.: US 10,247,885 B2
(45) Date of Patent: Apr. 2, 2019

(54) OPTICAL CONNECTOR, AND OPTICAL CONNECTOR MANUFACTURING METHOD

(71) Applicant: FUJIKURA LTD., Tokyo (JP)

(72) Inventors: Takashi Yamaguchi, Chiba (JP); Kunihiko Fujiwara, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/068,643

(22) PCT Filed: Jan. 12, 2017

(86) PCT No.: PCT/JP2017/000718
§ 371 (c)(1),
(2) Date: Jul. 6, 2018

(87) PCT Pub. No.: WO2017/126395
PCT Pub. Date: Jul. 27, 2017

(65) Prior Publication Data
US 2019/0025522 A1   Jan. 24, 2019

(30) Foreign Application Priority Data

Jan. 18, 2016   (JP) .................................. 2016-007200

(51) Int. Cl.
*G02B 6/38* (2006.01)
*G02B 6/44* (2006.01)

(52) U.S. Cl.
CPC ......... *G02B 6/3803* (2013.01); *G02B 6/4402* (2013.01); *G02B 6/4477* (2013.01)

(58) Field of Classification Search
CPC ...... G02B 6/3803; G02B 6/4402; G02B 6/44; G02B 6/4429; G02B 6/4471; G02B 6/4477; G02B 6/3807; G02B 6/3833
See application file for complete search history.

(56) References Cited

U.S. PATENT DOCUMENTS 4,447,120 A * 5/1984 Borsuk ................ G02B 6/4471
385/136
5,166,997 A * 11/1992 Norland ............... G02B 6/3887
385/87

(Continued)

FOREIGN PATENT DOCUMENTS

JP   H03-132707 A   6/1991
JP   2014-146027 A   8/2014

(Continued)

OTHER PUBLICATIONS

Office Action issued in corresponding Taiwanese Patent Application No. 106101717 dated Sep. 26, 2017 (4 pages).

*Primary Examiner* — John Bedtelyon
(74) *Attorney, Agent, or Firm* — Osha Liang LLP

(57) ABSTRACT

An optical connector includes a holding member that has a main body section including a bottom wall section and a pair of side wall sections. The holding member is capable of holding, in a space surrounded by the bottom wall section and the pair of side wall sections, an optical cable including a layer of a fibrous tensile member and an optical connector main body including a fixing section that fixes the holding member. The holding member also includes a pinching member that is configured to pinch the fibrous tensile member between itself and an outer surface of the bottom wall section of the main body section. The fixing section includes a pair of inner surfaces that pinches the main body section and the pinching member from a direction in which the pinching member and the bottom wall section pinch the fibrous tensile member.

15 Claims, 6 Drawing Sheets

(56) References Cited

U.S. PATENT DOCUMENTS

| | | | |
|---|---|---|---|
| 5,224,187 A * | 6/1993 | Davisdon | G02B 6/3887 385/100 |
| 5,644,673 A * | 7/1997 | Patterson | G02B 6/3887 385/138 |
| 6,997,620 B2 | 2/2006 | Kurooka et al. | |
| 8,221,006 B2 * | 7/2012 | Theuerkorn | G02B 6/3887 385/53 |
| 8,317,406 B2 | 11/2012 | Tamekuni et al. | |
| 8,567,015 B2 * | 10/2013 | Ward | G02B 6/4471 174/70 S |
| 9,116,310 B2 * | 8/2015 | Bran De Leon | G02B 6/3887 |
| 2013/0094814 A1 * | 4/2013 | Ishida | G02B 6/443 385/77 |
| 2014/0212096 A1 * | 7/2014 | Wei | G02B 6/3887 385/81 |

FOREIGN PATENT DOCUMENTS

| | | |
|---|---|---|
| WO | 2013/129485 A1 | 9/2013 |
| WO | 2016/167325 A1 | 10/2016 |

\* cited by examiner

OPTICAL CONNECTOR, AND OPTICAL CONNECTOR MANUFACTURING METHOD

TECHNICAL FIELD

The present invention generally relates to an optical connector and an optical connector manufacturing method.

BACKGROUND

A field-installable optical connector is a known example of a device for connecting optical fibers by abutting the optical fibers' respective end surfaces against one another. The field-installable optical connector is a type of optical connector having a structure that can be easily assembled to a terminal of an optical cable at an optical fiber laying site. A built-in fiber is factory-preinstalled in a ferrule of an optical connector before assembly, and an end section of the built-in fiber is arranged in a clamp section (mechanical splice). At the site of assembly, an outer sheath gripping member is made to grip an outer sheath of an optical cable, and an end section of a fiber to be inserted is stripped and exposed from the optical cable, and is inserted into the clamp section, and the optical fibers abut against one another and are connected inside the clamp section.

Patent Literature 1 describes a structure of an outer sheath gripping member that is used for a field-installable optical connector. The outer sheath gripping member of Patent Literature 1 has gripping projections formed on respective opposing surfaces of a pair of side wall sections. The gripping projections are wedged into an outer sheath of an optical cable, to grip and fix the optical cable between the pair of side wall sections.

PATENT LITERATURE

Patent Literature 1: International Publication WO2013/129485

The outer sheath gripping member of Patent Literature 1 is intended to grip an optical cable such as a drop cable or an indoor cable. Such optical cables as drop cables or indoor cables are square optical cables with a square cross-sectional shape in which an optical fiber and a pair of linear tensile members are collectively covered by an outer sheath, and the outer sheath is relatively hard. Thus, it is relatively easy to wedge the gripping projections of the outer sheath gripping member into the outer sheath and grip the optical cable.

In contrast, in cases of an optical cable including a fibrous tensile member (such as Kevlar (registered tradename)) between the optical fiber and the outer sheath, the outer sheath is soft and is prone to deform due to the layer of the fibrous tensile member. Thus, even when the optical cable is gripped from opposite sides, it is difficult to provide a sufficient gripping force.

SUMMARY

One or more embodiments of the invention provide a device to hold an optical cable having a layer of a fibrous tensile member with a sufficient holding force while facilitating the task of attaching the optical cable to a holding member.

One or more embodiments of the invention are directed to an optical connector including: a holding member that includes a main body section including a bottom wall section and a pair of side wall sections, and that is capable of holding, in a space surrounded by the bottom wall section and the pair of side wall sections, an optical cable including a layer of a fibrous tensile member; and an optical connector main body including a fixing section that fixes the holding member. The holding member includes a pinching member that is configured to pinch the fibrous tensile member between itself and an outer surface of the bottom wall section of the main body section. The fixing section includes a pair of inner surfaces that pinches the main body section and the pinching member from a direction in which the pinching member and the bottom wall section pinch the fibrous tensile member.

Other features of the invention are disclosed in the following description and the drawings.

In one or more embodiments of the invention, an optical cable having a layer of a fibrous tensile member can be held with a sufficient holding force while facilitating the task of attaching the optical cable to a holding member.

DETAILED DESCRIPTION

Figure 1A:
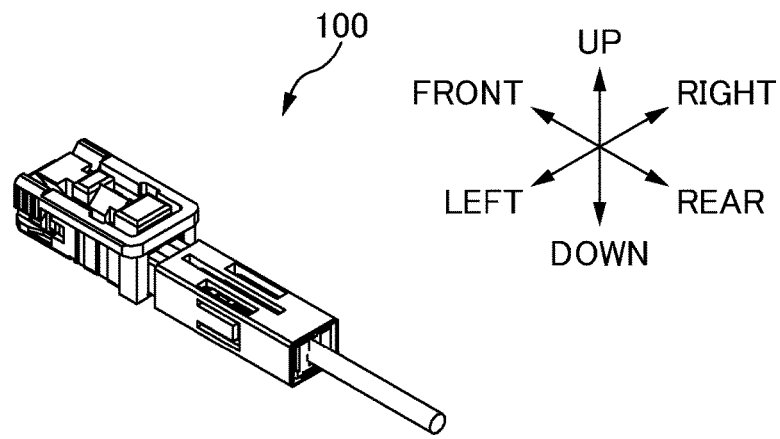
FIG. 1A is a perspective view of an optical connector 100 according to one or more embodiments.

The following description and the drawings reveal at least the following features according to one or more embodiments of the invention.

Disclosed is an optical connector including: a holding member that includes a main body section including a bottom wall section and a pair of side wall sections, and that is capable of holding, in a space surrounded by the bottom wall section and the pair of side wall sections, an optical cable including a layer of a fibrous tensile member; and an optical connector main body including a fixing section that fixes the holding member. The holding member includes a pinching member that is configured to pinch the fibrous tensile member between itself and an outer surface of the bottom wall section of the main body section. The fixing section includes a pair of inner surfaces that pinches the main body section and the pinching member from a direction in which the pinching member and the bottom wall section pinch the fibrous tensile member. With this optical connector, an optical cable having a layer of a fibrous tensile member can be held with a sufficient holding force while facilitating the task of attaching the optical cable to a holding member.

The main body section may have a fitting hole; and the pinching member may have a fitting projection to be fitted into the fitting hole. This achieves a temporarily-fixable structure.

The main body section and the pinching member may be integrally molded with a hinge section therebetween. In this way, the number of components can be reduced.

When viewed from a free end of the pinching member in a folded state, the hinge section may be located on an optical fiber end side of the optical cable. In this way, when the holding member is inserted into the fixing member, the main body section and the pinching member can be pressed gradually.

A front edge of the main body section may be located more toward the optical fiber end side than a fold line of the hinge section. In this way, the hinge section does not protrude when folded.

The main body section may have a positioning section that comes into contact with an end section of an outer sheath of the optical cable, and a discharge groove through which the fibrous tensile member is discharged from inside the side wall sections to outside; and the discharge groove may be located more toward the optical fiber end side than the positioning section. In this way, the optical cable (optical cable including a layer of a fibrous tensile member) is easy to position while allowing the fibrous tensile member to be discharged from the discharge groove.

A tapered guide section that gradually widens toward the optical fiber end side may be formed between the positioning section and the discharge groove. In this way, the fibrous tensile member can be easily guided to the discharge groove.

A curved side surface may be formed between the discharge groove and a lower surface of the bottom wall section. In this way, the fibrous tensile member discharged from the discharge groove to outside the side wall section can be guided easily to the lower surface of the bottom wall section.

A housing groove along an optical axis direction of the optical cable may be formed in the outer surface of the bottom wall section of the main body section; and the pinching member may be arranged in the housing groove. In this way, the respective sections on the outer sides of the housing groove of the main body section serve as slide surfaces (guide surfaces).

A groove that is wider than a width of the pinching member may be formed in one inner surface, of the pair of inner surfaces of the fixing section, that opposes the pinching member. In this way, a clearance can be provided for the pinching member.

Projections and depressions may be formed on the outer surface of the bottom wall section; and projections and depressions may be formed on the pinching member so as to mesh with the projections and depressions formed on the outer surface of the bottom wall section. In this way, the holding force for the optical cable can be increased.

Projections and depressions on the outer surface of the bottom wall section may mesh with the projections and depressions on the pinching member in a state where the pair of inner surfaces of the fixing section is in contact respectively with the main body section and the pinching member. In this way, the holding force for the optical cable can be increased.

The holding member may include gripping sections that project inwardly respectively from the pair of side wall sections and grip the optical cable. In this way, when the fibrous tensile member of the optical cable is guided to the outer surface of the bottom wall section, the optical cable can be held stably.

The holding member may include a first housing section that houses an outer sheath of the optical cable, and a second housing section that is separate from the first housing section and that houses an outer sheath of another optical cable having a different outer shape than the aforementioned optical cable; and an orientation, in a front-rear direction, of the holding member may be opposite between when fixing, to the fixing section, the holding member housing the outer sheath of the optical cable in the first housing section and when fixing, to the fixing section, the holding member housing the outer sheath of the optical cable in the second housing section. In this way, dedicated holding members do not have to be prepared for each type of optical cable.

Also disclosed is an optical connector manufacturing method, according to one or more embodiments, involving: preparing a holding member that includes a main body section including a bottom wall section and a pair of side wall sections, and a pinching member that is configured to pinch a fibrous tensile member between itself and an outer surface of the bottom wall section; housing, in a space surrounded by the bottom wall section and the pair of side wall sections of the main body section, an optical cable including a layer of a fibrous tensile member, and pinching the fibrous tensile member between the outer surface of the bottom wall section and the pinching member; inserting the holding member between a pair of inner surfaces of a fixing section, and thereby pinching the main body section and the pinching member with the pair of inner surfaces from a direction in which the pinching member and the bottom wall section pinch the fibrous tensile member; and fixing the holding member to the fixing section. With this optical connector manufacturing method, an optical cable having a layer of a fibrous tensile member can be held with a sufficient holding force while facilitating the task of attaching the optical cable to a holding member.

{Overall Structure}

Figure 1B:
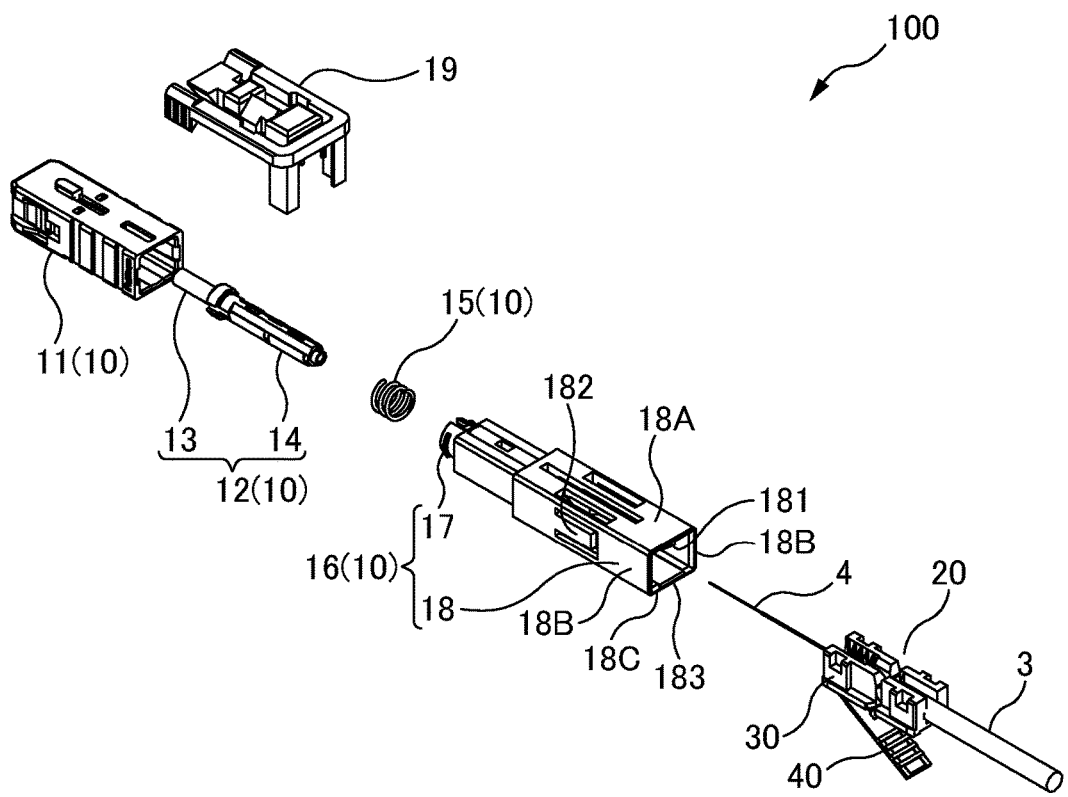
FIG. 1B is an exploded view of the optical connector 100 according to one or more embodiments.

FIG. 1A is a perspective view of an optical connector 100 according to one or more embodiments. FIG. 1B is an exploded view of the optical connector 100 according to one or more embodiments.

In the description below, the various directions are defined as illustrated in FIG. 1A. That is, the optical axis direction of the optical cable and optical fiber is referred to as "front-rear direction", the side toward which the optical cable extends is "rear", and the opposite side (the end surface side of ferrule 13 of optical connector 100) is "front". The direction in which interposition member 19 is inserted and withdrawn is referred to as "up-down direction", the interposition member 19 side as viewed from optical connector main body 10 is "up", and the opposite side is "down". The direction perpendicular to the front-rear direction and the up-down direction is "left-right direction", the right-hand side when viewing the front side from the rear side is "right", and the left-hand side is "left".

The optical connector 100 is a field-installable optical connector for connecting optical fibers by mechanical splicing, and is an optical connector assembled to a terminal of an optical cable. The optical connector 100 is, for example, an SC-type optical connector (F04-type optical connector compliant with JIS C5973).

An optical fiber 4 of a round cable 3 can be connected to the optical connector 100. The round cable 3 is an optical cable having a circular cross-sectional shape, and is an optical cable in which a fibrous tensile member 5 (see FIG. 3) is arranged between the optical fiber 4 and an outer sheath. The fibrous tensile member 5 is, for example, Kevlar (registered tradename).

Further, an optical fiber 7 of a square cable 6 (see FIG. 5) can be connected to the optical connector 100 of one or more embodiments, other than an optical fiber 4 of a round cable 3. The square cable 6 is an optical cable having a rectangular/square cross-sectional shape, and is, for example, a drop cable or an indoor cable. The square cable 6 is an optical cable in which an optical fiber 7 and a pair of linear tensile members (not illustrated) are collectively covered by an outer sheath. The pair of tensile members is arranged so as to sandwich the optical fiber 7. The direction in which the pair of tensile members sandwiches the optical fiber 7 is the long-side direction of the cross section of the square cable 6.

In cases of a square cable 6, the outer sheath that collectively covers the optical fiber 7 and the pair of linear tensile members is relatively hard, and thus, the square cable 6 is relatively easy to grip.

In contrast, a round cable 3 includes a layer of fibrous tensile member 5 between the optical fiber 4 and the outer sheath, and the presence of the layer of fibrous tensile member renders the outer sheath prone to deform, and also the outer sheath is soft. Thus, even when the optical cable is gripped from opposite sides, it is difficult to provide a sufficient gripping force. One or more embodiments enable holding with a sufficient holding force even with a round cable 3, as will be described below.

The optical connector 100 includes an optical connector main body 10, an interposition member 19, and an outer sheath gripping member 20 (corresponding to "holding member").

The optical connector main body 10 includes a front-side housing 11, a clamp-equipped ferrule 12, a spring 15, and a rear-side housing 16.

The front-side housing 11 and the rear-side housing 16 are a housing that houses the clamp-equipped ferrule 12. The front-side housing 11 is attached to the rear-side housing 16.

The clamp-equipped ferrule 12 is retractably housed while being biased frontward with respect to the rear-side housing 16 by the spring 15. The clamp-equipped ferrule 12 includes a ferrule 13 and a clamp section (mechanical splice section) 14. Herein, the ferrule 13 is a cylindrical ferrule used for a simplex optical connector. A front-side end section of a built-in fiber (not illustrated) is inserted and fixed inside the ferrule, and the end surface thereof is polished together with the ferrule. A rear-side end section of the built-in fiber is arranged in an alignment groove of the clamp section 14. The clamp section 14 is a member (optical fiber connection device) for matching (aligning) the axes of the built-in fiber and an insertion fiber (herein, the optical fiber 4) by mechanical splicing and fixing the built-in fiber and the insertion fiber together.

The spring 15 is a member for biasing the retractably-housed ferrule 13 (clamp-equipped ferrule 12) toward the front.

The rear-side housing 16 includes a stop ring section 17 and a fixing section 18.

The stop ring section 17 functions as a stop ring, and contacts the rear end of the spring 15.

The fixing section 18 is a section for fixing the outer sheath gripping member 20. The fixing section 18 includes an upper plate section 18A, a pair of side plate sections 18B, and a bottom plate section 18C. A space surrounded by the upper plate section 18A, the pair of side plate sections 18B, and an inner surface of the bottom plate section 18C forms a housing space for housing the outer sheath gripping member 20.

The upper plate section 18A is a section that constitutes an upper surface of the fixing section 18 along the front-rear direction. The upper plate section 18A serves as a slide surface for sliding upper-side slide surfaces 321 (described further below) of the outer sheath gripping member 20 along the front-rear direction. The upper plate section 18A has a projection 181. The projection 181 is a section that presses, toward the bottom plate section 18C side (downward), an end section of the outer sheath of the round cable 3 gripped by the outer sheath gripping member 20. The projection 181 is provided so as to project downward at a center, in the width direction (left-right direction), of the upper plate section 18A from the lower surface thereof.

The side plate sections 18B are sections that constitute the side surfaces of the fixing section 18 along the front-rear direction, and are provided in a pair at respective end sections, in the left-right direction, of the fixing section 18. The respective inner surfaces of the pair of side plate sections 18B serve as slide surfaces for sliding the respective side slide surfaces 313 (described further below) of the outer sheath gripping member 20 along the front-rear direction. Each side plate section 18B has an engagement claw section 182. The engagement claw section 182 has a claw (not illustrated) that projects inwardly from the inner surface of the side plate section 18B, and when the outer sheath gripping member 20 is housed inside the fixing section 18, the claw section engages with an engagement section (first engagement section 334 or second engagement section 343) of the outer sheath gripping member 20. By this engagement, the outer sheath gripping member 20 housed in the fixing section 18 can be restricted from moving rearward.

The bottom plate section 18C is a section that constitutes a bottom surface of the fixing section 18 along the front-rear direction. A groove 183 is formed in an inner surface of the bottom plate section 18C. The groove 183 is a groove that provides a clearance for a tongue section 40 (corresponding to "pinching member") of the outer sheath gripping member 20. In one or more embodiments, when the fibrous tensile member 5 is pinched between the tongue section 40 and a main body section 30 of the outer sheath gripping member 20, the tongue section 40 does not completely come into tight contact with the main body section 30 (see FIGS. 3C and 3D). So, the groove 183 is provided in the bottom plate section 18C to provide a clearance for the tongue section 40. To provide a clearance for the tongue section 40, the width (i.e., the length in the left-right direction) of the groove 183 is formed so as to be wider than the width of the tongue section 40. The sections of the bottom plate section 18C on the left and right outer sides of the groove 183 serve as slide surfaces for sliding respective lower-side slide surfaces 312 (described further below) of the outer sheath gripping member 20 along the front-rear direction.

In one or more embodiments, when the outer sheath gripping member 20 is inserted inside the fixing section 18, the main body section 30 and the tongue section 40 of the outer sheath gripping member 20 are respectively pressed between the lower surface of the upper plate section 18A and the upper surface of the groove 183 of the bottom plate section 18C, and thereby the fibrous tensile member 5 is pinched and fixed between the tongue section 40 and the main body section 30 (later-described bottom wall section 31). Stated differently, the lower surface of the upper plate section 18A and the upper surface of the bottom plate section 18C (the groove 183) correspond to the pair of inner surfaces that pinches the main body section 30 and the tongue section 40 from the up-down direction (i.e., from a direction in which the tongue section 40 and the main body section 30 (bottom wall section 31) pinch the fibrous tensile member 5).

The interposition member 19 is a member for opening/closing a gap of the clamp section 14 of the optical connector main body 10. An insertion hole is formed in the upper surface of the optical connector main body 10, and an interposition piece (wedge (not illustrated)) extending from the lower side of the interposition member 19 is inserted into the insertion hole.

{Outer Sheath Gripping Member 20}

Figure 2A:
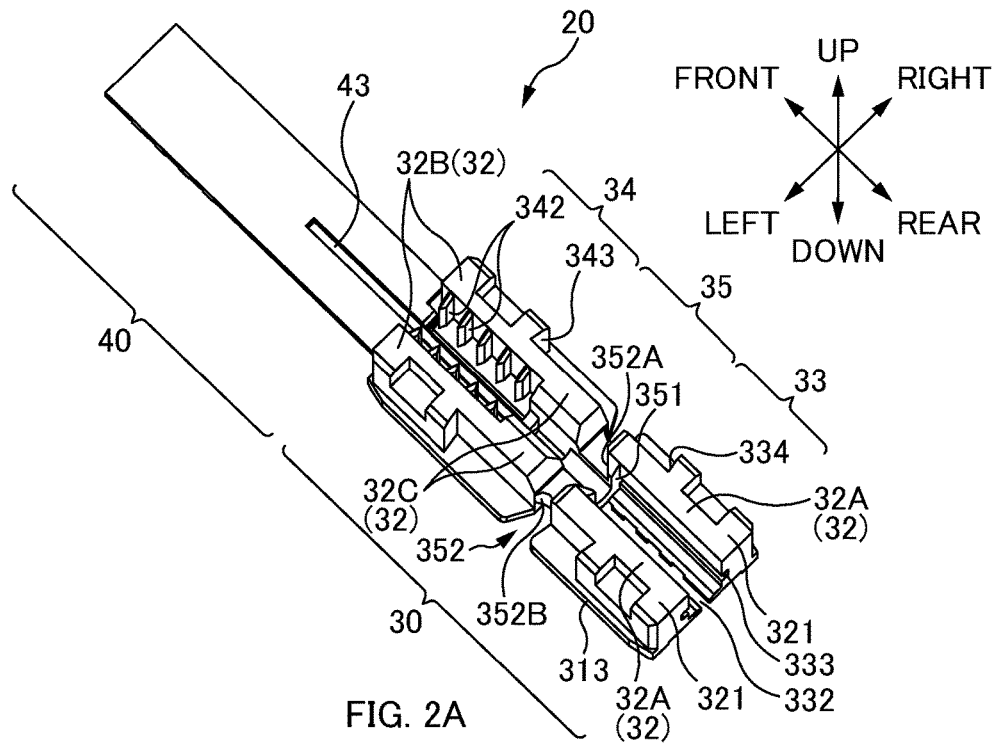
FIG. 2A is a perspective view of an outer sheath gripping member 20 as viewed from obliquely above according to one or more embodiments.
Figure 2B:
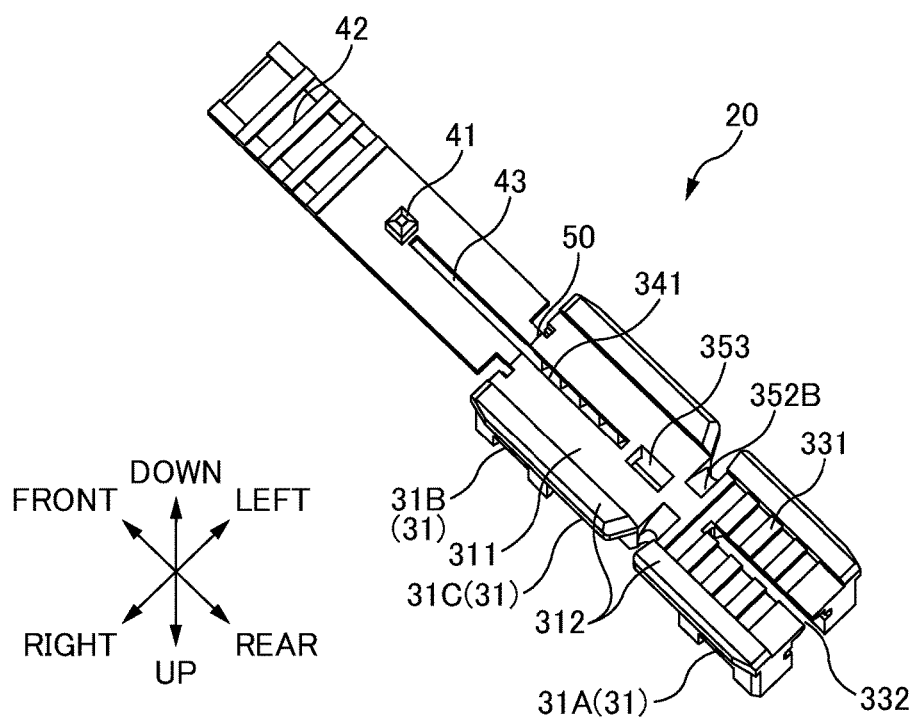
FIG. 2B is a perspective view of the outer sheath gripping member 20 as viewed from obliquely below according to one or more embodiments.

FIG. 2A is a perspective view of the outer sheath gripping member 20 as viewed from obliquely above according to one or more embodiments. FIG. 2B is a perspective view of the outer sheath gripping member 20 as viewed from obliquely below according to one or more embodiments.

The outer sheath gripping member 20 is a member capable of holding a round cable 3 and a square cable 6. The outer sheath gripping member 20 is an integrally molded article made of a resin, and includes a main body section 30, a tongue section 40, and a hinge section 50. The resin material is POM (e.g., Duracon (registered tradename)).

Structure of Main Body Section 30:

The main body section 30 includes a bottom wall section 31 and a pair of side wall sections 32, and the cross section thereof is constituted in a substantially U-shape by the bottom wall section 31 and the pair of side wall sections 32. A round cable 3 and a square cable 6 can be held in a space surrounded by the bottom wall section 31 and the pair of side wall sections 32.

The bottom wall section 31 is a section that forms the bottom of the main body section 30 along the front-rear direction. The bottom wall section 31 is a plate-shaped section having a rectangular shape that is long in the front-rear direction, and includes a first bottom wall section 31A constituting a first housing section 33 (described further below), a second bottom wall section 31B constituting a second housing section 34 (described further below), and a central bottom wall section 31C constituting a central section 35 (described further below).

The bottom wall section 31 also includes a tongue section housing groove 311, lower-side slide surfaces 312, and side slide surfaces 313. The tongue section housing groove 311 is a groove for housing the tongue section 40, and is provided along the front-rear direction in the lower surface of the bottom wall section 31. The lower-side slide surfaces 312 are sections on the left and right outer sides of the tongue section housing groove 311, and, when the outer sheath gripping member 20 is inserted into the fixing section 18, are guided by the inner surface of the bottom plate section 18C (the lower surface of the sections on the left and right outer sides of the groove 183). The side slide surfaces 313 are the left and right end sections (lateral sections) of the bottom wall section 31, and, when the outer sheath gripping member 20 is inserted into the fixing section 18, are guided by the respective inner surfaces of the side plate sections 18B of the fixing section 18.

The side wall sections 32 are sections that form the side surfaces of the main body section 30 along the front-rear direction. The side wall sections 32 are sections formed so as to stand up from the respective left and right edges of the bottom wall section 31. The side wall sections 32 are arranged with a spacing therebetween so as to oppose one another in the left-right direction. The side wall sections 32 include first side wall sections 32A constituting the first housing section 33 (described further below), second side wall sections 32B constituting the second housing section 34 (described further below), and central side wall sections 32C constituting the central section 35 (described further below). Each side wall section 32 has an upper-side slide surface 321. The upper-side slide surface 321 is the upper-side end surface of each side wall section 32. When the outer sheath gripping member 20 is inserted into the fixing section 18, the upper-side slide surfaces 321 are guided by the inner surface (lower surface) of the upper plate section 18A of the fixing section 18.

The main body section 30 includes the first housing section 33, the second housing section 34, and the central section 35.

The first housing section 33 is a section for housing the outer sheath section of a round cable 5, and is a section formed in a rear-side end section of the main body section 30. The first housing section 33 also serves as a section in which an optical fiber 7 of a square cable 6 is inserted (see FIG. 5). The first housing section 33 is constituted by the first bottom wall section 31A and the pair of first side wall sections 32A.

The first bottom wall section 31A constituting the first housing section 33 is provided with a main-body-side pinching section 331 and a first slit 332.

The main-body-side pinching section 331 is provided in the tongue section housing groove 311 of the first bottom wall section 31A, and is a section that pinches the fibrous tensile member 5 between itself and the tongue section 40 (more specifically, a tongue-section-side pinching section 42). As illustrated in FIG. 2B, projections and depressions are formed in the main-body-side pinching section 331 (i.e., the outer surface of the first bottom wall section 31A).

The first slit 332 is provided so as to open in the center, in the left-right direction, of the first bottom wall section 31A along the front-rear direction. By forming the first slit 332, the first slit 332 can provide a clearance for accommodating the bend in an optical fiber 7 of a square cable 6 at the time of butting when the square cable 6's optical fiber 7 is inserted in the first housing section 33, thus allowing the optical fiber 7 to curve gently.

The pair of first side wall sections 32A constituting the first housing section 33 is provided with respective guide grooves 333 and first engagement sections 334.

The guide grooves 333 are grooves for guiding a round cable 5 in the front-rear direction. Each guide groove 333 is provided along the front-rear direction on the inner side of the respective first side wall section 32A.

The first engagement sections 334 are sections that engage with the respective engagement claw sections 182 of the fixing section 18. More specifically, the first engagement sections 334 engage with the respective engagement claw sections 182 of the fixing section 18 when a square cable 6 is used (see FIG. 5).

The second housing section 34 is a section for housing the outer sheath section of a square cable 6, and is a section formed in a front-side end section of the main body section 30. The second housing section 34 also serves as a section in which an optical fiber 4 of a round cable 3 is inserted. Thus, the outer sheath gripping member 20 of one or more embodiments can comply with a square cable 6 by inverting its front-rear direction (see FIG. 5). The second housing section 34 is constituted by the second bottom wall section 31B and the pair of second side wall sections 32B.

Figure 4A:
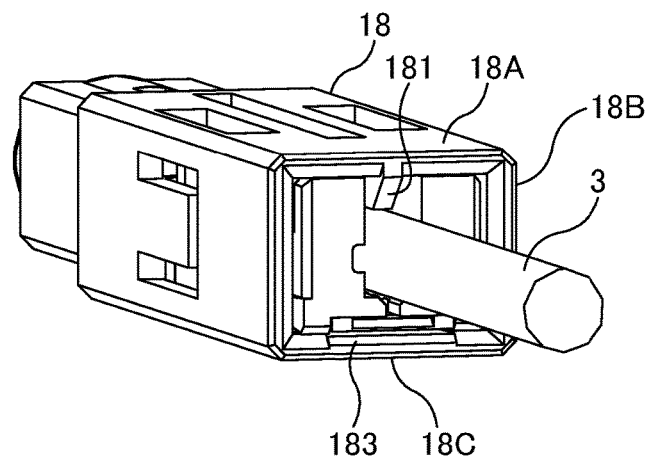
FIG. 4A is a view, from the rear, of a state in which the outer sheath gripping member 20 has been inserted in a fixing section 18 according to one or more embodiments.
Figure 4B:
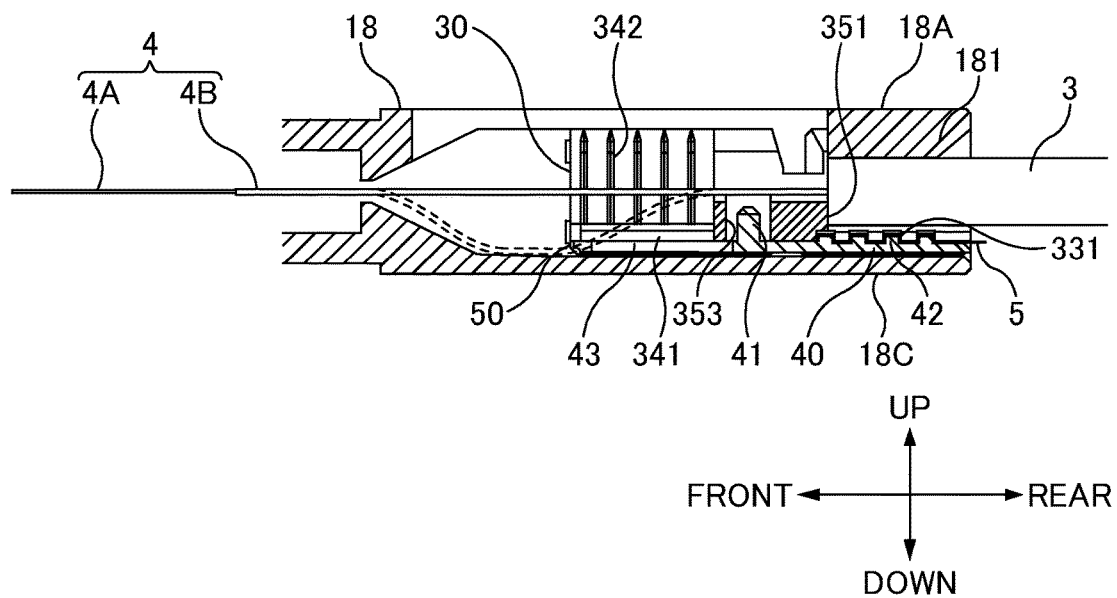
FIG. 4B is a lateral sectional view of a state in which the outer sheath gripping member 20 has been inserted in the fixing section 18 according to one or more embodiments.

The second bottom wall section 31B constituting the second housing section 34 is provided with a second slit 341 along the front-rear direction. By forming the second slit 341, the second slit 341 (and a tongue-section-side slit 43 (described further below)) can provide a clearance for accommodating the bend in an optical fiber 4 of a round cable 3 at the time of butting when the round cable 3's optical fiber 4 is inserted in the second housing section 34, thus allowing the optical fiber 4 to curve gently. It should be noted, however, that the optical fiber 4 does not necessarily bend downward as illustrated in FIG. 4B, but may bend upward. In that case, the interior of the second housing section 34 can serve as a clearance for the bent optical fiber 4.

The pair of second side wall sections 32B constituting the second housing section 34 is provided with respective gripping claws 342 and second engagement sections 343.

The gripping claws 342 are protrusions along the up-down direction that project inwardly from the respective inner surfaces of the pair of second side wall sections 32B. When viewed from the up-down direction, each gripping claw 342 is formed so as to have a substantially triangular cross-sectional shape that becomes sharper toward the projecting side (inner side). The ridgeline of each gripping claw 342 is parallel to the up-down direction. Thus, a square cable 6 can be pressed easily into the second housing section 34 from the upper side (opened side) toward the lower side (bottom side), and the square cable 6 housed in the second housing section 34 is less likely to get displaced in the front-rear direction.

Each second side wall section 32B includes a plurality of the gripping claws 342 arranged with intervals therebetween along the front-rear direction. The respective ridgelines of the plurality of gripping claws 342 are parallel to one another. The gripping claws 342 of one second side wall section 32B are arranged so as to oppose the gripping claws 342 of the other second side wall section 32B. By arranging the gripping claws 342 in opposition to one another, the gripping claws 342 can be wedged easily into the outer sheath of a square cable 6 from both sides in the width direction.

The second engagement sections 343 are sections that engage with the respective engagement claw sections 182 of the fixing section 18. More specifically, the second engagement sections 343 engage with the respective engagement claw sections 182 of the fixing section 18 when a round cable 3 is used.

The central section 35 is a section between the first housing section 33 and the second housing section 34. The central section 35 is constituted by the central bottom wall section 31C and the pair of central side wall sections 32C. The central section 35 includes a positioning section 351, discharge grooves 352, and a fitting hole 353.

The positioning section 351 is a section that comes into contact with a cut section of the outer sheath (i.e., an end section of the outer sheath) of a round cable 3. By bringing the cut section of the outer sheath of a round cable 3 into contact with the positioning section 351, the round cable 3 can be positioned in the front-rear direction with respect to the main body section 30 (outer sheath gripping member 20).

Figure 3A:
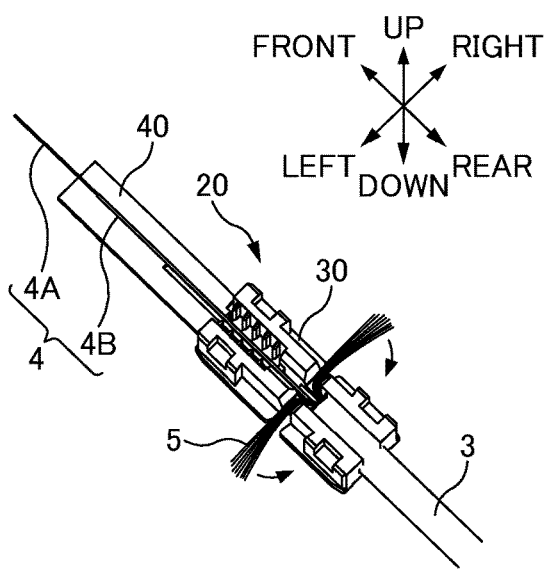
FIGS. 3A to 3D are diagrams illustrating how the optical connector 100 is assembled to a terminal of a round cable 3 according to one or more embodiments.

The discharge grooves 352 are sections for discharging the fibrous tensile member 5 of a round cable 3 to outside the side wall sections 32 (central side wall sections 32C) (see FIG. 3A). Each discharge groove 352 is a slit-shaped section formed from an edge on the upper side (opened side) of the respective side wall section 32. In one or more embodiments, the discharge grooves 352 are located more toward the front side (optical fiber end side) than the positioning section 351 in the front-rear direction. Thus, the cut section of the outer sheath of a round cable 3 can easily be brought into contact with the positioning section 351 while allowing the fibrous tensile member 5 of the round cable 3 to be discharged outside from the discharge grooves 352. If the discharge grooves 352 were located more toward the rear side than the positioning section 351, the fibrous tensile member 5, which extends out from a cut section of a round cable 3, may get pulled toward the discharge groove 352 side when discharging the fibrous tensile member 5 from the discharge grooves 352, and the cut section of the round cable 3 may get displaced toward the discharge grooves 352. This may cause the cut section in the outer sheath of the round cable 3 to separate from the positioning section 351 (resulting in positional displacement of the round cable 3 in the front-rear direction).

Each discharge groove 352 has a tapered guide section 352A and a curved side surface 352B.

The tapered guide section 352A is a section formed between the positioning section 351 and the discharge groove 352 in a tapered shape that gradually widens toward the front side (optical fiber end side). The tapered guide section 352A is provided in each side wall section 32 (central side wall section 32C). The tapered guide section 352A allows the fibrous tensile member 5 to be easily guided to each discharge groove 352.

The curved side surface 352B is a section formed between the discharge groove 352 and the lower surface of the bottom wall section 31 (central bottom wall section 31C) such that its side surface is curved and recessed inwardly. By providing the curved side surface 352B, the fibrous tensile member 5 discharged from the discharge groove 352 to outside the side wall section 32 can be guided easily to the lower surface of the bottom wall section 31.

The fitting hole 353 is a hole into which a fitting projection 41 (described further below) of the tongue section 40 is fitted, and is provided in the central bottom wall section 31C. Fitting the fitting projection 41 into the fitting hole 353 can temporarily fix the tongue section 40 to the main body section 30.

Structure of Tongue Section 40:

The tongue section 40 (corresponding to "pinching member") is a member that is configured to pinch the fibrous tensile member 5 between itself and the outer surface (tongue section housing groove 311) of the bottom wall section 31 of the main body section 30. The tongue section 40 is formed integrally with the main body section 30 with the hinge section 50 therebetween. The tongue section 40 can be folded toward the lower surface side of the main body section 30 (see FIG. 3B) about a fold line in the hinge section 50. The tongue section 40 is a rectangular plate-shaped member, and is housed in the tongue section housing groove 311 of the main body section 30 when folded. The tongue section 40 includes a fitting projection 41, a tongue-section-side pinching section 42, and a tongue-section-side slit 43.

The fitting projection 41 is provided so as to fit into the fitting hole 353 in the central section 35 of the main body section 30 by folding the tongue section 40.

The tongue-section-side pinching section 42 is a section that pinches and fixes the fibrous tensile member 5 between itself and the main-body-side pinching section 331, and is provided in a position so as to oppose the main-body-side pinching section 331 when the tongue section 40 is folded. The tongue-section-side pinching section 42 has projections and depressions formed so as to mesh with the projections and depressions of the main-body-side pinching section 331 (projections and depressions on the outer surface of the first bottom wall section 31A).

The tongue-section-side slit 43 is a slit for providing a clearance for accommodating the curving of the optical fiber 4 of a round cable 3, and is provided along the front-rear direction in communication with the second slit 341 of the main body section 30. After the tongue section 40 is folded, the tongue-section-side slit 43, together with the second slit 341, forms a slit that opens at the front edge, thus providing a clearance for the optical fiber 4 of a round cable 3. Opening this slit (constituted by the tongue-section-side slit 43 and the second slit 341) can provide greater clearance for the bent optical fiber 4 compared to cases where only the second slit 341 is provided, and thus the curving of the optical fiber 4 can be made gentler.

On the other hand, the tongue section 40 has no slit for providing a clearance for the optical fiber 7 of a square cable 6. The reason to this is as follows. If a slit for a square cable 6 is formed, the slit will be formed along the front-rear direction in a section (i.e., tongue-section-side pinching section 42) for pinching the fibrous tensile member 5. This may give rise to the possibility that the fibrous tensile member 5 will escape outside from the slit when pinching the fibrous tensile member 5 of a round cable 3. In one or more embodiments, since the tongue section 40 has no slit for a square cable 6, the fibrous tensile member 5 can be retained (gripped) reliably.

The hinge section 50 is a section that integrates the main body section 30 and the tongue section 40, and is provided between the front end of the main body section 30 and the rear end of the tongue section 40 in a manner so as to allow the tongue section 40 to be folded. As described above, in one or more embodiments, the outer sheath gripping member 20 (main body section 30, tongue section 40, and hinge section 50) is molded integrally by a resin. This, however, is not a limitation, and it is possible to adopt a hinge structure in which the main body section 30 and the tongue section 40 are separate members. Alternatively, the main body section 30 and the tongue section 40 may be completely separate members (with no hinge structure). However, by molding the main body section 30 and the tongue section 40 integrally as in one or more embodiments, the number of components can be reduced.

The hinge section 50, when viewed from the free end (the rear end in FIGS. 3C and 3D) of the tongue section 40 in a folded state, is located on the front side (the end side of the optical fiber 4 of a round cable 3). Thus, when the tongue section 40 is folded and the fibrous tensile member 5 is pinched between it and the main body section 30, the tongue section 40 becomes sloped so as to separate from the main body section 30 from the front side (hinge section 50 side) toward the rear side (free end side). In this way, when the outer sheath gripping member 20 is inserted into the fixing section 18, the main body section 30 and the tongue section 40 can be pressed gradually.

The fold line in the hinge section 50 along the left-right direction is located more toward the rear than the front edge of the main body section 30. In this way, the hinge section 50 does not protrude frontward when the tongue section 40 is folded.

{Assembly Procedure for Round Cable}

FIGS. 3A to 3D are diagrams illustrating how the optical connector 100 is assembled to a terminal of a round cable 3 according to one or more embodiments. FIG. 4A is a view, from the rear, of a state in which the outer sheath gripping member 20 has been inserted in the fixing section 18 according to one or more embodiments. FIG. 4B is a lateral sectional view of a state in which the outer sheath gripping member 20 has been inserted in the fixing section 18 according to one or more embodiments.

First, a worker cuts an outer sheath and a fibrous tensile member 5 at an end section of a round cable 3 to expose predetermined lengths of the fibrous tensile member 5 and an optical fiber 4 from the outer sheath of the round cable 3. Then, the covering at an end section of the optical fiber 4 is removed, so that a predetermined length of the optical fiber 4 (bare optical fiber section 4A and cover section 4B) extends toward the front side from the round cable 3. Note that the removal of the covering at the end section of the optical fiber 4 may be performed after housing the round cable 3 in the first housing section 33.

Then, as illustrated in FIG. 3A, the worker houses the outer sheath of the round cable 3 in the first housing section 33 of the outer sheath gripping member 20, and passes the optical fiber 4 of the round cable 3 through the second housing section 34. The round cable 3 is guided by the guide grooves 33 and housed in the first housing section 33. At this time, the outer sheath's cut section (outer sheath's end section) of the round cable 3 is brought into contact with the positioning section 351 of the outer sheath gripping member 20, and thereby, the round cable 3 can be positioned with respect to the main body section 30 (outer sheath gripping member 20) in the front-rear direction. In this state, the worker discharges the fibrous tensile member 5 of the round cable 3 from the discharge grooves 352 to outside the side wall sections 32. In one or more embodiments, tapered guide sections 352A are provided between the positioning section 351 and the respective discharge grooves 352, and thus, the fibrous tensile member 5 can be easily guided to the respective discharge grooves 352.

Figure 3B:
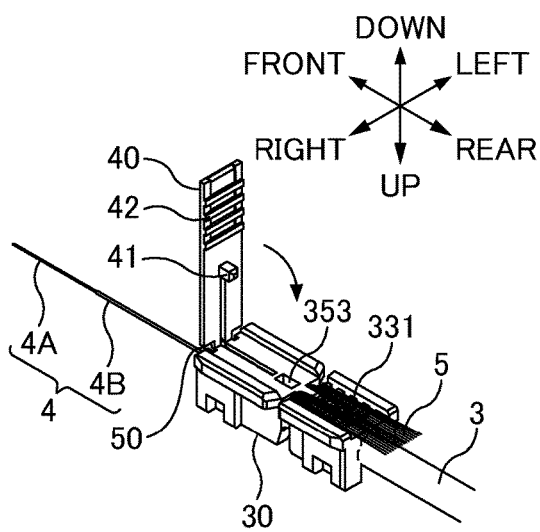
Figure 3C:
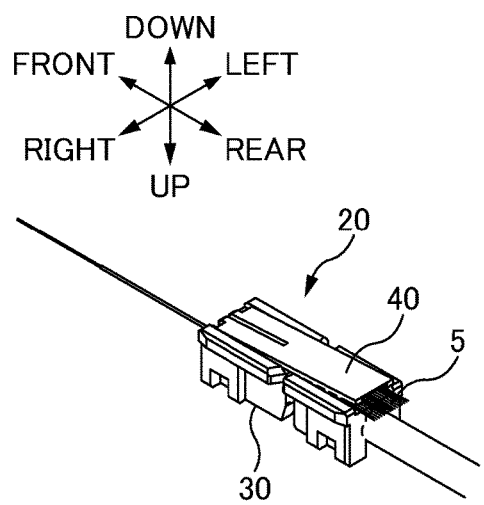

Next, as illustrated in FIG. 3B, the worker guides the discharged fibrous tensile member 5 along the respective curved side surfaces 352B to the lower surface of the main-body-side pinching section 331 of the bottom wall section 31. Then, the hinge section 50 is bent, to fold the tongue section 40 toward the lower surface of the bottom wall section 31 of the main body section 30 and fit the fitting projection 41 of the tongue section 40 into the fitting hole 353 in the central section 35 of the main body section 30. Thereby, as illustrated in FIG. 3C, the tongue section 40 is temporarily fixed to the main body section 30, and the fibrous tensile member 5 is pinched between the main-body-side pinching section 331 of the main body section 30 and the tongue-section-side pinching section 42 of the tongue section 40. Note, however, that since the fibrous tensile member 5 is sandwiched between the main-body-side pinching section 331 and the tongue-section-side pinching section 42, the tongue section 40 is not completely in tight contact with the tongue section housing groove 311, but rather, the free end (rear end) side of the tongue section 40 projects from the lower surface of the main body section 30, as illustrated in the figure.

Figure 3D:
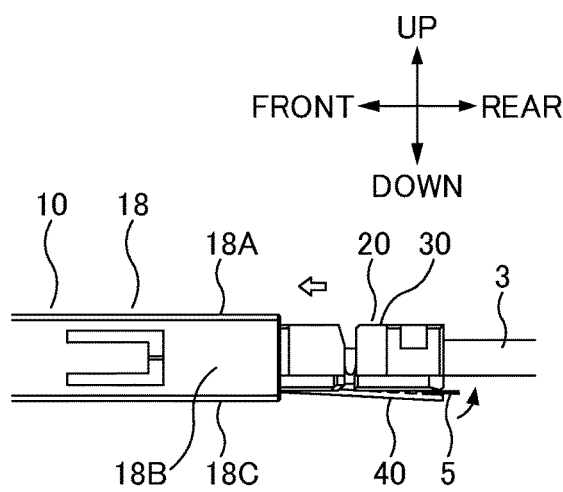

Then, as illustrated in FIG. 3D, the worker inserts the outer sheath gripping member 20 from its hinge section 50 side into an insertion opening on the rear side of the fixing section 18 of the optical connector main body 10. The outer sheath gripping member 20 is inserted into the fixing section 18 by: the lower-side slide surfaces 312 of the main body section 30 being guided by the inner surface of the bottom plate section 18C of the fixing section 18; the side slide surfaces 313 being guided respectively by the respective inner surfaces of the pair of side plate sections 18B of the fixing section 18; and the upper-side slide surfaces 321 being guided by the inner surface of the upper plate section 18A of the fixing section 18. At this time, the main body section 30 and the tongue section 40 of the outer sheath gripping member 20 are pinched, from the up-down direction, between the inner surface (lower surface) of the upper plate section 18A of the fixing section 18 and the inner surface of the bottom plate section 18C (the upper surface of the groove 183), and along with the insertion, the main body section 30 and the tongue section 40 of the outer sheath gripping member 20 are gradually pressed. Stated differently, the tongue section 40 (and the sections on the respective outer sides of the tongue section housing groove 311 in the bottom wall section 31 of the main body section 30) serves as a slide surface.

Then, in a state where the inner surface of the upper plate section 18A of the fixing section 18 and the inner surface of the bottom plate section 18C are in contact respectively with the main body section 30 and the tongue section 40, the projections and depressions in the main-body-side pinching section 331 come into a meshing state with the projections and depressions in the tongue-section-side pinching section 42. Herein, "meshing state" means that the projections in one of the pinching sections enter between adjacent projections of the other pinching section. In this way, the fibrous tensile member 5 is gripped (fixed) reliably, and the round cable 3 is held with a sufficient holding force.

Further, when the outer sheath gripping member 20 is inserted into the fixing section 18, the optical fiber 4 of the round cable 3 is inserted into the alignment groove in the clamp section 14 of the optical connector main body 10. When the outer sheath gripping member 20 is inserted into the fixing section 18 until the second engagement sections 343 of the main body section 30 of the outer sheath gripping member 20 engage respectively with the engagement claw sections 182 of the fixing section 18, the end surface of the built-in fiber and the end surface of the optical fiber 4 of the round cable 3 butt against one another on the alignment groove, and the optical fiber 4 of the round cable 3 gets slightly bent (for example, see the dotted lines in FIG. 4B). In this state, the worker removes the interposition member 19 from the optical connector main body 10, and fixes the built-in fiber and the round cable 3's optical fiber 4 by the clamp section 14.

{Assembly Procedure for Square Cable}

As described above, an optical fiber 7 of a square cable 6 can be connected to the optical connector 100 of one or more embodiments, other than an optical fiber 4 of a round cable 3. More specifically, a square cable 6 can be attached to the outer sheath gripping member 20 by inverting the orientation of the outer sheath gripping member 20 in the front-rear direction.

Figure 5:
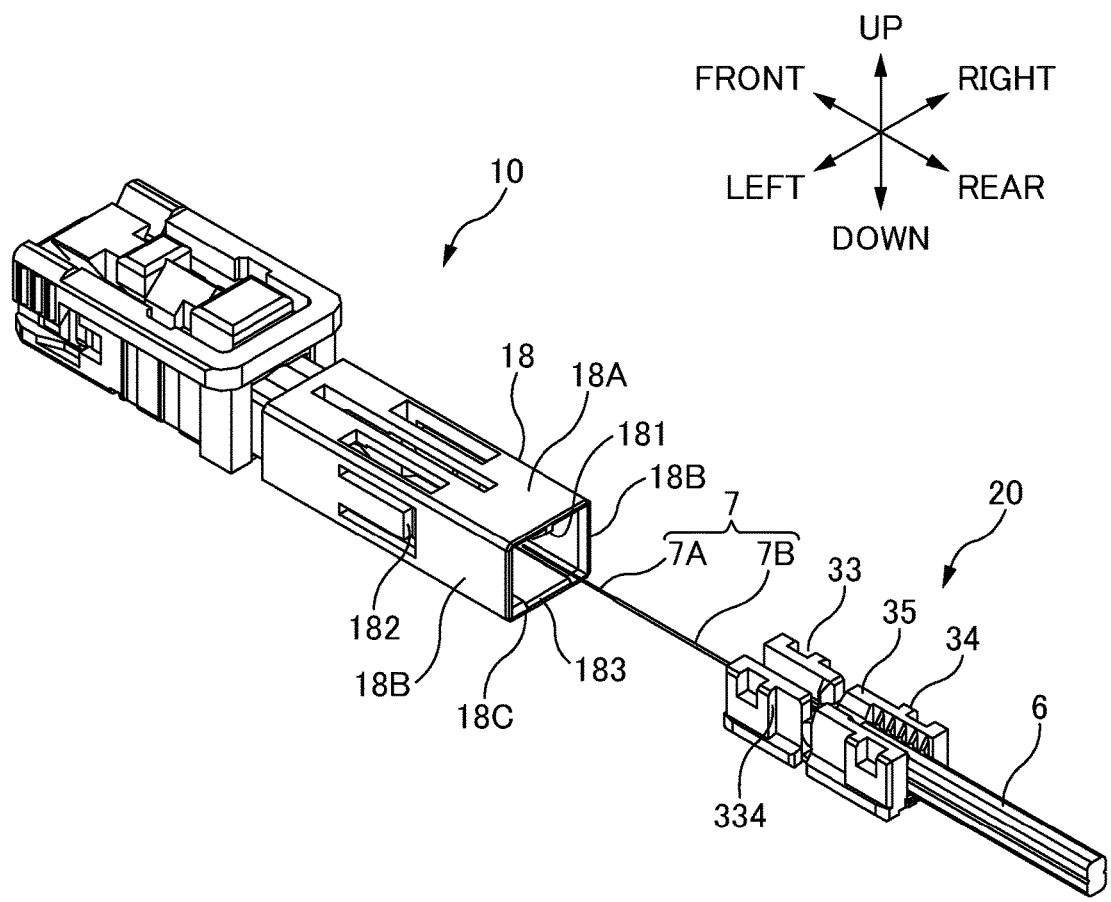
FIG. 5 is a diagram illustrating how the optical connector 100 is assembled to a terminal of a square cable 6 according to one or more embodiments.

FIG. 5 is a diagram illustrating how the optical connector 100 is assembled to a terminal of a square cable 6 according to one or more embodiments. The orientation of the outer sheath gripping member 20 in the front-rear direction is opposite from the case of a round cable 3 (FIG. 3). Further, when using a square cable 6, a worker folds the tongue section 40 in advance in a state where nothing is arranged between the main body section 30 and the tongue section 40, and houses the tongue section 40 in the tongue section housing groove 311 of the main body section 30.

Then, the worker houses the outer sheath of the square cable 6 in the second housing section 34 of the outer sheath gripping member 20 such that the long-side direction in the cross section of the square cable 6 is parallel to the up-down direction. The worker also passes the optical fiber 7 of the square cable 6 through the first housing section 33. At this time, the gripping claws 342 of the second housing section 34 wedge into the outer sheath of the square cable 6, and the square cable 6 is fixed (gripped) by the gripping claws 342. The worker also removes the covering at an end section of the optical fiber 7 stripped and exposed from the square cable 6, and the end section of the optical fiber 7 is cut. Thus, a predetermined length of the optical fiber 7 (bare optical fiber section 7A and cover section 7B) extends toward the front side from the outer sheath gripping member 20, and a predetermined length of bare optical fiber 7A is provided at the end section of the optical fiber 7.

Next, the worker inserts, into the fixing section 18, the outer sheath gripping member 20 gripping the square cable 6. When the outer sheath gripping member 20 is inserted into the fixing section 18, the optical fiber 7 of the square cable 6 is inserted into the alignment groove in the clamp section 14 of the optical connector main body 10. When the outer sheath gripping member 20 is inserted into the fixing section 18 until the first engagement sections 334 of the main body section 30 of the outer sheath gripping member 20 engage respectively with the engagement claw sections 182 of the fixing section 18, the end surface of the built-in fiber and the end surface of the optical fiber 7 of the square cable 6 butt against one another on the alignment groove, and the optical fiber 7 of the square cable 6 gets slightly bent. In this state, the worker removes the interposition member 19 from the optical connector main body 10, and fixes the built-in fiber and the square cable 6's optical fiber 7 by the clamp section 14.

Modified Example

Figure 6:
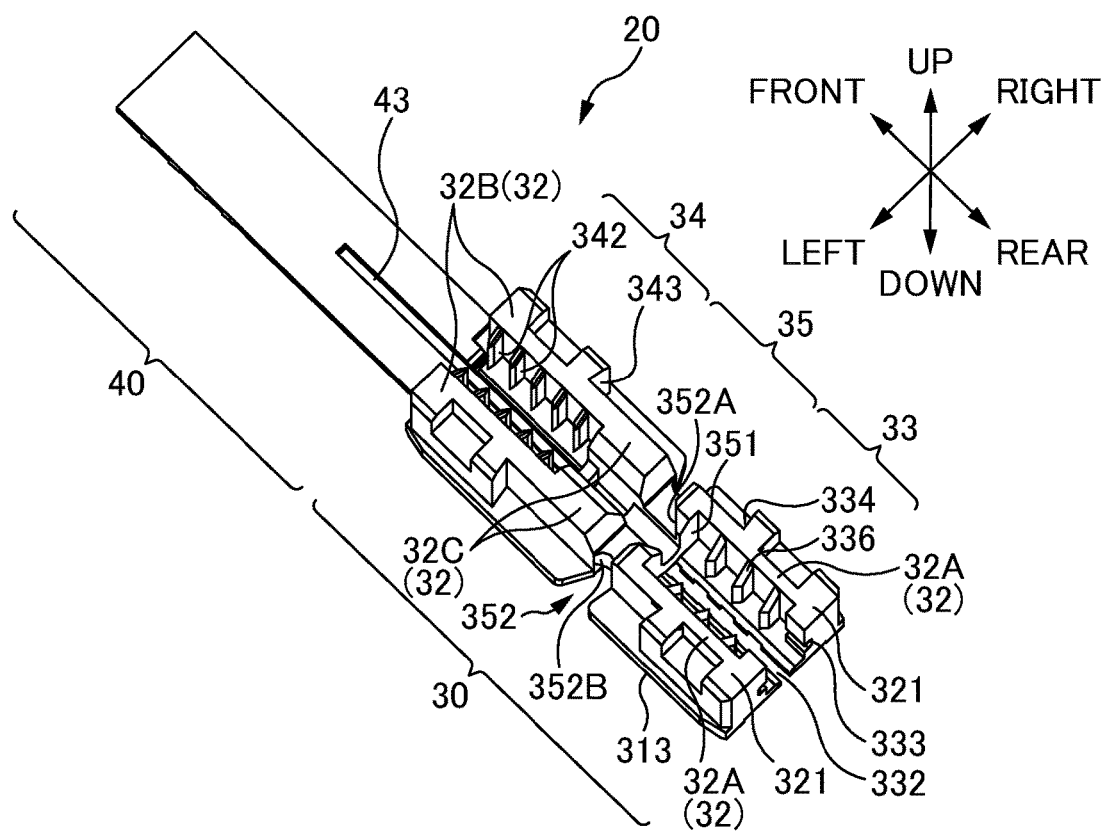
FIG. 6 is a perspective view of a modified example of an outer sheath gripping member 20 according to one or more embodiments.

FIG. 6 is a perspective view illustrating a modified example of an outer sheath gripping member 20 according to one or more embodiments. FIG. 6 is a view from the same direction as in FIG. 2A. In FIG. 6, members having the same construction as in FIG. 2A are accompanied by the same reference signs, and explanation thereon is omitted.

An outer sheath gripping member 20 illustrated in FIG. 6 includes round-cable gripping claws 336 (corresponding to "gripping sections") on a pair of first side wall sections 32A constituting a first housing section 33.

The round-cable gripping claws 336 are sections that project inwardly respectively from the respective inner surfaces of the pair of first side wall sections 32A and grip a round cable 3. Like the gripping claw 342, the round-cable gripping claws 336 are protrusions along the up-down direction. When viewed from the up-down direction, each round-cable gripping claw is formed so as to become sharper toward the projecting side (inner side). The ridgeline of each round-cable gripping claw 336 is parallel to the up-down direction. Thus, a round cable 3 can be pressed easily into the first housing section 33 from the upper side (opened side) toward the lower side (bottom side).

Each first side wall section 32A includes a plurality of the round-cable gripping claws 336 arranged with intervals therebetween along the front-rear direction. The respective ridgelines of the plurality of round-cable gripping claws 336 are parallel to one another. The round-cable gripping claws 336 of one first side wall section 32A are arranged so as to oppose the round-cable gripping claws 336 of the other first side wall section 32A.

When a round cable 3 is pressed into the first housing section 33, the round-cable gripping claws 336 grip the round cable 3. Thus, the round cable 3 housed in the first housing section 33 is less likely to get displaced in the front-rear direction, and the round cable 3 can be held stably when the fibrous tensile member 5 of the round cable 3 is guided to the lower surface of the main-body-side pinching section 331 of the bottom wall section 31.

{Summary}

According to the one or more embodiments, the optical connector 100 includes: an outer sheath gripping member 20 that includes a main body section 30 including a bottom wall section 31 and a pair of side wall sections 32, and that is capable of holding, in a space surrounded by the bottom wall section 31 and the pair of side wall sections 32, a round cable 3 including a layer of a fibrous tensile member 5; and an optical connector main body 10 including a fixing section 18 that fixes the outer sheath gripping member 20. The outer sheath gripping member 20 includes a tongue section 40 that is configured to pinch the fibrous tensile member 5 between itself and a lower surface (tongue section housing groove 311) of the bottom wall section 31 of the main body section 30. The fixing section 18 includes a pair of inner surfaces (a lower surface of an upper plate section 18A of the fixing section 18 and an upper surface of a groove 183 of a bottom plate section 18C) that pinches the main body section 30 and the tongue section 40 from the up-down direction in which the tongue section 40 and the bottom wall section 31 pinch the fibrous tensile member 5. Thus, simply by inserting the outer sheath gripping member 20 into the fixing section 18 in a state where the fibrous tensile member 5 is pinched between the main body section 30 and the tongue section 40, the fibrous tensile member 5 can be fixed between the main body section 30 and the tongue section 40 and the round cable 3 can be held. As described above, according to one or more embodiments, a round cable 3 having a layer of a fibrous tensile member 5 can be held with a sufficient holding force while facilitating the task of attaching the round cable 3 to the outer sheath gripping member 20.

In one or more embodiments, as illustrated in FIGS. 2B and 4B, the main body section 30 of the outer sheath gripping member 20 has a fitting hole 353; and the tongue section 40 has a fitting projection 41 to be fitted into the fitting hole 353. Thus, the tongue section 40 can be temporarily be fixed to the main body section 30.

In one or more embodiments, as illustrated in FIG. 2B, the main body section 30 and the tongue section 40 are integrally molded with a hinge section 50 therebetween. In this way, the number of components can be reduced.

In one or more embodiments, as illustrated in FIG. 2B, when viewed from a free end (rear-side end) of the tongue section 40 in a folded state, the hinge section 50 is located on the front side (end side of the round cable 3's optical fiber 4). In this way, when the outer sheath gripping member 20 is inserted into the fixing section 18, the main body section 30 and the tongue section 40 can be pressed gradually.

In one or more embodiments, as illustrated in FIG. 2B, a front edge of the main body section 30 is located more toward the front side (optical fiber 4's end side) than a fold line of the hinge section 50. In this way, the hinge section 50 does not protrude when the tongue section 40 is folded.

In one or more embodiments, as illustrated in FIG. 2A, the main body section 30 has a positioning section 351 that comes into contact with an end section of an outer sheath of the round cable 3, and a discharge groove 352 through which the fibrous tensile member 5 is discharged from inside the side wall sections 32 to outside; and the discharge groove 352 is located more toward the front side (optical fiber 4's end side) than the positioning section 351. In this way, the cut section in the outer sheath of the round cable 3 can easily be brought into contact with the positioning section 351 and positioning is facilitated, while allowing the fibrous tensile member 5 of the round cable 3 to be discharged outside from the discharge grooves 352.

In one or more embodiments, as illustrated in FIG. 2A, a tapered guide section 352A that gradually widens toward the front side (optical fiber 4's end side) is formed between the positioning section 351 and the discharge groove 352. In this way, the fibrous tensile member 5 can be easily guided to the discharge groove 352.

In one or more embodiments, as illustrated in FIG. 2A, a curved side surface 352B is formed between the discharge groove 352 and a lower surface of the bottom wall section 31 (central bottom wall section 31C). In this way, the fibrous tensile member 5 discharged from the discharge groove 352 to outside the side wall section 32 can be guided easily to the lower surface of the bottom wall section 31.

In one or more embodiments, as illustrated in FIGS. 2B and 3C, a tongue section housing groove 311 along the front-rear direction (optical axis direction of the optical cable 4) is formed in the lower surface (outer surface) of the bottom wall section 31 of the main body section 30; and the tongue section 40 is arranged in the tongue section housing groove 311. In this way, when the outer sheath gripping member 20 is inserted into the fixing section 18, the respective sections on the outer sides of the tongue section housing groove 311 of the main body section 30 (and the tongue section 40) serve as slide surfaces (guide surfaces).

In one or more embodiments, as illustrated in FIGS. 1B and 4A, a groove 183 that is wider than the width of the tongue section 40 is formed in the upper surface of the bottom plate section 18C, of the pair of inner surfaces (the lower surface of the upper plate section 18A and the upper surface of the bottom plate section 18C) of the fixing section 18, that opposes the tongue section 40. In this way, a clearance can be provided for the tongue section 40 which is not completely in tight contact with the tongue section housing groove 311.

In one or more embodiments, as illustrated in FIG. 2B: projections and depressions are formed on the lower surface (outer surface) of a first bottom wall section 31A; and projections and depressions are formed in a tongue-section-side pinching section 42 of the tongue section 40 so as to mesh with the projections and depressions formed on the lower surface of the first bottom wall section 31A. In this way, the fibrous tensile member 5 can be fixed (gripped), and the holding force for the round cable 3 can be increased.

In one or more embodiments, the projections and depressions on the lower surface (outer surface) of the first bottom wall section 31A mesh with the projections and depressions in the tongue-section-side pinching section 42 of the tongue section 40 in a state where the pair of inner surfaces (the lower surface of the upper plate section 18A and the upper surface of the bottom plate section 18C) of the fixing section 18 is in contact respectively with the main body section 30 and the tongue section 40 of the outer sheath gripping member 20. In this way, the fibrous tensile member 5 can be fixed (gripped) more reliably by inserting the outer sheath gripping member 20 into the fixing section 18, and the holding force for the round cable 3 can be increased.

In one or more embodiment (modified example), as illustrated in FIG. 6, the outer sheath gripping member 20 includes round-cable gripping claws 336 that project inwardly respectively from the pair of first side wall sections 32A constituting the first housing section 33, and that grip the round cable 3. In this way, when the fibrous tensile member 5 of the round cable 3 is guided to the lower surface of the main-body-side pinching section 331 of the bottom wall section 31, the round cable 3 can be held stably.

In one or more embodiments, as illustrated in FIGS. 3A and 5: the outer sheath gripping member 20 includes a first housing section 33 that houses an outer sheath of the round cable 3, and a second housing section 34 that is separate from the first housing section 33 and that houses an outer sheath of a square cable 6 that is different from the aforementioned round cable 3; and the orientation, in the front-rear direction, of the outer sheath gripping member 20 is opposite between when fixing, to the fixing section 18, the outer sheath gripping member 20 housing the outer sheath of a round cable 3 in the first housing section 33 and when fixing, to the fixing section 18, the outer sheath gripping member 20 housing the outer sheath of a square cable 6 in the second housing section 34. In this way, dedicated outer sheath gripping members 20 do not have to be prepared for each type of optical cable.

Others:

The foregoing embodiments are for facilitating the understanding of the invention, and are not to be construed as limiting the invention. The invention can be modified or improved without departing from the gist thereof, and needless to say, the invention encompasses equivalents thereof.

{Outer Sheath Gripping Member 20}

In the foregoing embodiment, the outer sheath gripping member 20 is constructed to be capable of housing both a round cable 3 and a square cable 6. The outer sheath gripping member 20, however, can be constructed to grip only a round cable 3. In that case, the outer sheath gripping member 20 does not need to have a second housing section 34, nor does it have to have first engagement sections 334 in the first housing section 33.

REFERENCE SIGNS LIST

3: Round cable;
4: Optical fiber;
4A: Bare optical fiber section;
4B: Cover section;
5: Fibrous tensile member;
6: Square cable;
4: Optical fiber;
7A: Bare optical fiber section;
7B: Cover section;
10: Optical connector main body;
11: Front-side housing;
12: Clamp-equipped ferrule;
13: Ferrule;
14: Clamp section;
15: Spring;
16: Rear-side housing;
17: Stop ring section;
18: Fixing section;
18A: Upper plate section;
18B: Side plate section;
18C: Bottom plate section;
19: Interposition member;
20: Outer sheath gripping member;
30: Main body section;
31: Bottom wall section;
31A: First bottom wall section;
31B: Second bottom wall section;
31C: Central bottom wall section;
32: Side wall section;
32A: First side wall section;
32B: Second side wall section;
32C: Central side wall section;
33: First housing section;
34: Second housing section;
35: Central section;
40: Tongue section;
41: Fitting projection;
42: Tongue-section-side pinching section;
43: Tongue-section-side slit;
50: Hinge section;
100: Optical connector;
181: Projection;
182: Engagement claw section;
183: Groove;
311: Tongue section housing groove;
312: Lower-side slide surface;
313: Side slide surface;
321: Upper-side slide surface;
331: Main-body-side pinching section;
332: First slit;
333: Guide groove;
334: First engagement section;
336: Round-cable gripping claw;
341: Second slit;
342: Gripping claw;
343: Second engagement section;
351: Positioning section;
352: Discharge groove;
352A: Tapered guide section;
352B: Curved side surface;
353: Fitting hole.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical connector comprising:
   a holding member that:
      includes a main body section including a bottom wall section and a pair of side wall sections, and
      holds, in a space surrounded by the bottom wall section and the pair of side wall sections, an optical cable including a layer of a fibrous tensile member; and
   an optical connector main body including a fixing section that fixes the holding member, wherein:
   the holding member further includes a pinching member that pinches the fibrous tensile member between the pinching member and an outer surface of the bottom wall section of the main body section; and
   the fixing section includes a pair of inner surfaces that pinches the main body section and the pinching member from a direction in which the pinching member and the bottom wall section pinch the fibrous tensile member.

2. The optical connector according to claim 1, wherein:
   the main body section has a fitting hole; and
   the pinching member has a fitting projection to be fitted into the fitting hole.

3. The optical connector according to claim 1, wherein the main body section and the pinching member are integrally molded with a hinge section therebetween.

4. The optical connector according to claim 3, wherein, when viewed from a free end of the pinching member in a folded state, the hinge section is located on an optical fiber end side of the optical cable.

5. The optical connector according to claim 4, wherein a front edge of the main body section is located closer to the optical fiber end side than a fold line of the hinge section.

6. The optical connector according to claim 1, wherein:
the main body section includes:
a positioning section that comes into contact with an end section of an outer sheath of the optical cable, and
a discharge groove through which the fibrous tensile member is discharged from inside the side wall sections to outside; and
the discharge groove is located closer to the optical fiber end side than the positioning section.

7. The optical connector according to claim 6, wherein a tapered guide section that gradually widens toward the optical fiber end side is formed between the positioning section and the discharge groove.

8. The optical connector according to claim 6, wherein a curved side surface is formed between the discharge groove and a lower surface of the bottom wall section.

9. The optical connector according to claim 1, wherein:
a housing groove along an optical axis direction of the optical cable is formed in the outer surface of the bottom wall section of the main body section; and
the pinching member is disposed in the housing groove.

10. The optical connector according to claim 9, wherein a groove that is wider than a width of the pinching member is formed in one of the pair of inner surfaces that opposes the pinching member.

11. The optical connector according to claim 1, wherein:
projections and depressions are formed on the outer surface of the bottom wall section; and
projections and depressions formed on the pinching member mesh with the projections and depressions formed on the outer surface of the bottom wall section.

12. The optical connector according to claim 11, wherein the projections and depressions on the outer surface of the bottom wall section mesh with the projections and depressions on the pinching member in a state where the pair of inner surfaces of the fixing section is in contact respectively with the main body section and the pinching member.

13. The optical connector according to claim 1, wherein the holding member includes gripping sections that project inwardly respectively from the pair of side wall sections and grip the optical cable.

14. The optical connector according to claim 1, wherein:
the holding member further includes:
a first housing section that houses an outer sheath of the optical cable, and
a second housing section that is separate from the first housing section and that houses an outer sheath of another optical cable having a different outer shape than said optical cable; and
an orientation, in a front-rear direction, of the holding member is opposite between
when fixing, to the fixing section, the holding member housing the outer sheath of the optical cable in the first housing section and
when fixing, to the fixing section, the holding member housing the outer sheath of the optical cable in the second housing section.

15. An optical connector manufacturing method comprising:
preparing a holding member that includes:
a main body section including a bottom wall section and a pair of side wall sections, and
a pinching member that pinches a fibrous tensile member between itself and an outer surface of the bottom wall section;
housing, in a space surrounded by the bottom wall section and the pair of side wall sections of the main body section, an optical cable including a layer of a fibrous tensile member, and pinching the fibrous tensile member between the outer surface of the bottom wall section and the pinching member;
inserting the holding member between a pair of inner surfaces of a fixing section, and pinching the main body section and the pinching member with the pair of inner surfaces from a direction in which the pinching member and the bottom wall section pinch the fibrous tensile member; and
fixing the holding member to the fixing section.

* * * * *